United States Patent
Han

(10) Patent No.: US 7,962,366 B2
(45) Date of Patent: Jun. 14, 2011

(54) AUTOMATIC PRODUCT PRICE PAYMENT COUNTER

(76) Inventor: Moon-Key Han, Seoul (KR)

( * ) Notice: Subject to any disclaimer, the term of this patent is extended or adjusted under 35 U.S.C. 154(b) by 0 days.

(21) Appl. No.: 12/795,079

(22) Filed: Jun. 7, 2010

(65) Prior Publication Data

US 2010/0250377 A1 Sep. 30, 2010

Related U.S. Application Data

(63) Continuation-in-part of application No. 10/593,040, filed on Sep. 15, 2006, now abandoned.

(30) Foreign Application Priority Data

Mar. 16, 2004 (KR) .................... 20-2004-0007159 U

(51) Int. Cl.
*G06Q 20/00* (2006.01)

(52) U.S. Cl. ................ 705/16; 186/36; 186/37; 186/61; 235/379; 235/383

(58) Field of Classification Search ......................... None
See application file for complete search history.

(56) References Cited

U.S. PATENT DOCUMENTS

| 5,222,445 A | 6/1993 | Capraro |
| 5,992,570 A * | 11/1999 | Walter et al. .................... 186/36 |
| 6,886,746 B1 | 5/2005 | Edwards |
| 2003/0226891 A1 | 12/2003 | Sato |

FOREIGN PATENT DOCUMENTS

| KR | 10-2002-0007628 | 1/2002 |
| KR | 10-2003-0088613 | 11/2003 |
| KR | 10-2005-0032663 | 4/2005 |
| WO | 98/43149 | 10/1998 |

OTHER PUBLICATIONS

"What's With Long Lines? Check It Out Yourself", Wilson, Dave, Los Angeles Times, Apr. 26, 2001, p. 1.*

* cited by examiner

*Primary Examiner* — M. Thein

(74) *Attorney, Agent, or Firm* — Cantor Colburn LLP

(57) ABSTRACT

Disclosed herein is an automatic product price payment counter including an input device, an output device, and a control device. The input device inputs information about one or more products to be purchased by detecting a barcode attached thereon. The output device displays the information about the products and performs steps of paying for the price of the products. The control device performs comparison and determination on the information input from the input device with information stored in product information DataBase (DB). The input device includes a weight measurement unit including a first balance and a second balance configured to measure the weight of the products, and a cash slot and a card slot. The output device includes a cash change slot configured to refund change after the price of the products has been paid in cash.

4 Claims, 4 Drawing Sheets

AUTOMATIC PRODUCT PRICE PAYMENT COUNTER

This is a continuation-in-part application of application Ser. No. 10/593,040, filed on Sep. 15, 2006, which claims priority to Korean Application No. 20-2004-0007159, filed on Mar. 16, 2004. The entire contents of the above-referenced applications are hereby incorporated by reference.

BACKGROUND OF THE INVENTION

1. Field of the Invention

The present invention relates generally to an automatic product price payment counter which allows a purchaser to select at least one product and to calculate and pay for the price of the product to be purchased in locations, such as discount markets.

In more detail, the present invention relates to an automatic product price payment counter including an input device for inputting information about one or more products to be purchased by detecting a barcode attached on each of the products, an output device for displaying the information about the input products and performing the respective steps of paying for the price of the products, and a control device for performing comparison and determination on the information input from the input device with information about corresponding products stored in a product information Data-Base (DB), and controlling the functions of the output unit. The input device includes a weight measurement unit including a first balance and a second balance configured to respectively measure the weight of the products, and a cash slot and a card slot provided to pay for the price of the products using cash and a card, respectively. The output device includes a cash change slot configured to refund change after the price of the products has been paid in cash, and a blocking unit configured to include an entrance blocking unit and an exit blocking unit which are provided on first sides of entrance and exit doors of the counter, respectively, and which control opening and closing of the corresponding doors.

The control device controls the output device so that the output device performs each of steps of paying for the price of the products if the total weight of the products measured by the first balance is identical with the total weight measured by the second balance and if the unit weight of each of the products is identical with information stored in the product information DB, controls the exit blocking unit of the exit door so that a purchaser can leave if the payment for the price of the products, the information about which has been input using the product checking unit, has normally completed and various types of receipts are output from the output device, and controls the entrance blocking unit so that a next purchaser who is waiting at the outside of the entrance door can approach the counter if the exit blocking unit blocks the exit door after the purchaser goes out.

2. Description of the Related Art

Generally, the products, displayed in distribution centers, such as various types of discount markets, have a barcode recording information (hereinafter, referred to as "basic information") about the item, weight, and unit price of each of the products. In the case of agricultural and marine products which have not had measured the unit price for the weight thereof and which have not been packed, there are devices for instantaneously measuring the weight of such a product, inputting the unit price of the product given based on the measured weight, and generating the barcode corresponding to the product, so that a purchaser is guaranteed being able to freely select a desired product and being able to purchase the product on which a barcode recording basic information about the corresponding product is attached.

As described above, the price of the product which is directly selected by the purchaser is calculated in such a way that a clerk, who is in charge of the calculation of the price of the product at a counter provided on one side of a store, inputs the basic information of the product recorded in the barcode of the corresponding product using the input device of a product price calculator, and the calculated price is paid in cash or using various types of cards through the dialogue between the purchaser and the clerk who is in charge of the calculation of the price in the store.

The method of calculating the price of a product according to a conventional art performed in distribution centers, such as discount markets, through the dialogue between a purchaser and a clerk who is in charge of the calculation has an advantage in that extemporaneous remarks are easily taken into consideration according to the business conditions in effect in such a store.

However, the burden of personnel expenses increases from the point of view of the expenses for managing the entire store, thereby decreasing sales profits.

Further, the method of calculating the price of a product according to the conventional art has the fatal problem of increasing both distribution and household expenses, thereby bringing a vicious cycle of frugality down upon society.

In particular, the industry is in the situation of medium/large-sized discount stores being jumbled up and enterprises, the existence of which is threatened due to heated competitive pricing, increasing. Herein, a method of providing good-quality services while reducing the burden of personnel expenses in order to reduce costs inside has been becoming an urgent task to be solved.

SUMMARY OF THE INVENTION

Accordingly, the present invention has been made keeping in mind the above problems occurring in the prior art, and an object of the present invention is to provide an automatic product price payment counter which allows a purchaser in a distribution center, such as a discount market, to directly select at least one product to be purchased and to process calculation and payment for the product by her/himself without a clerk who is in charge of calculating the price of a product, and which controls the purchaser leaving the store after the transaction has been performed in consideration of the weight and price calculation state of the product.

Another object of the present invention is to provide an automatic product price payment counter, so that the burden of expenses for managing the current distribution industry can be solved by improving the internal structure thereof, and that good-quality services can be provided to customers.

In order to accomplish the above object, the present invention provides an automatic product price payment counter including: an input device including a product checking unit configured to input information about one or more products to be purchased by detecting a barcode attached on each of the products, a button unit configured to include a group of buttons for selecting corresponding steps of paying for the price of the products; an output device including a display unit for displaying the input information about the products and performing a display at the corresponding steps of paying for the price of the products, and an output unit for outputting various types of receipts when payment for the price of the products is completed; and a control device for performing comparison and determination on the information input from the input device, and controlling functions of the output device, wherein the input device includes a weight measurement unit including a first balance provided on the entrance door side of the counter and configured to measure the total weight of the products before the information about the products is input using the product checking unit and a second balance provided on the exit door side of the counter and configured to measure the weight of the products which have been taken off from the first balance and about which the information has been input using the product checking unit; and a cash slot and a card slot card slot provided to pay for the price of the products using cash and a card, respectively.

Further, the output device includes a cash change slot configured to refund change after the price of the products has been paid; and a blocking unit configured to include an entrance blocking unit and an exit blocking unit which are provided on first sides of entrance and exit doors of the counter, respectively, and which control opening and closing of the corresponding doors.

Further, the control device includes a product information DataBase (DB) for storing basic information about the respective products (an item, weight, and a unit price), controls the output device so that the output device performs each of steps of paying for the price of the products only if the total weight of the products measured by the first balance is identical with the total weight measured by the second balance and if the unit weight of each of the products is identical with information stored in the product information DB, controls the exit blocking unit of the exit door so that a purchaser can leave if the payment for the price of the products, about which the information has been input using the product checking unit, has normally completed and various types of receipts are output to the output unit, and controls the entrance blocking unit of the entrance door so that a next purchaser who is waiting can approach the counter if the exit blocking unit blocks the exit door after the purchaser goes out.

Further, the control device controls power so that the payment of the price of the products can be performed when the purchaser puts the products on the first balance, and controls power so that the payment of the price of the products cannot be performed when the purchaser removes the products from the second balance after the purchaser normally completes the payment of the price of the products.

As the additional elements of the present invention, the input device further includes a conveyor switch for controlling a conveyor for carrying the products so that the purchaser can easily move the products, and the output unit further includes a conveyor provided on one side of the front end of the counter, and a signal unit provided on one side of the counter.

Using the additional elements, the control device controls the signal unit so that the signal unit issues an alarm when the total weight of the products measured by the first balance is not identical with the total weight measured by the second balance, when the total weight measured by the first and second balances is not identical with the sum of the weight of the products information fetched from the product information DB, or when the payment for the price of the products input using the product checking unit has not been normally completed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
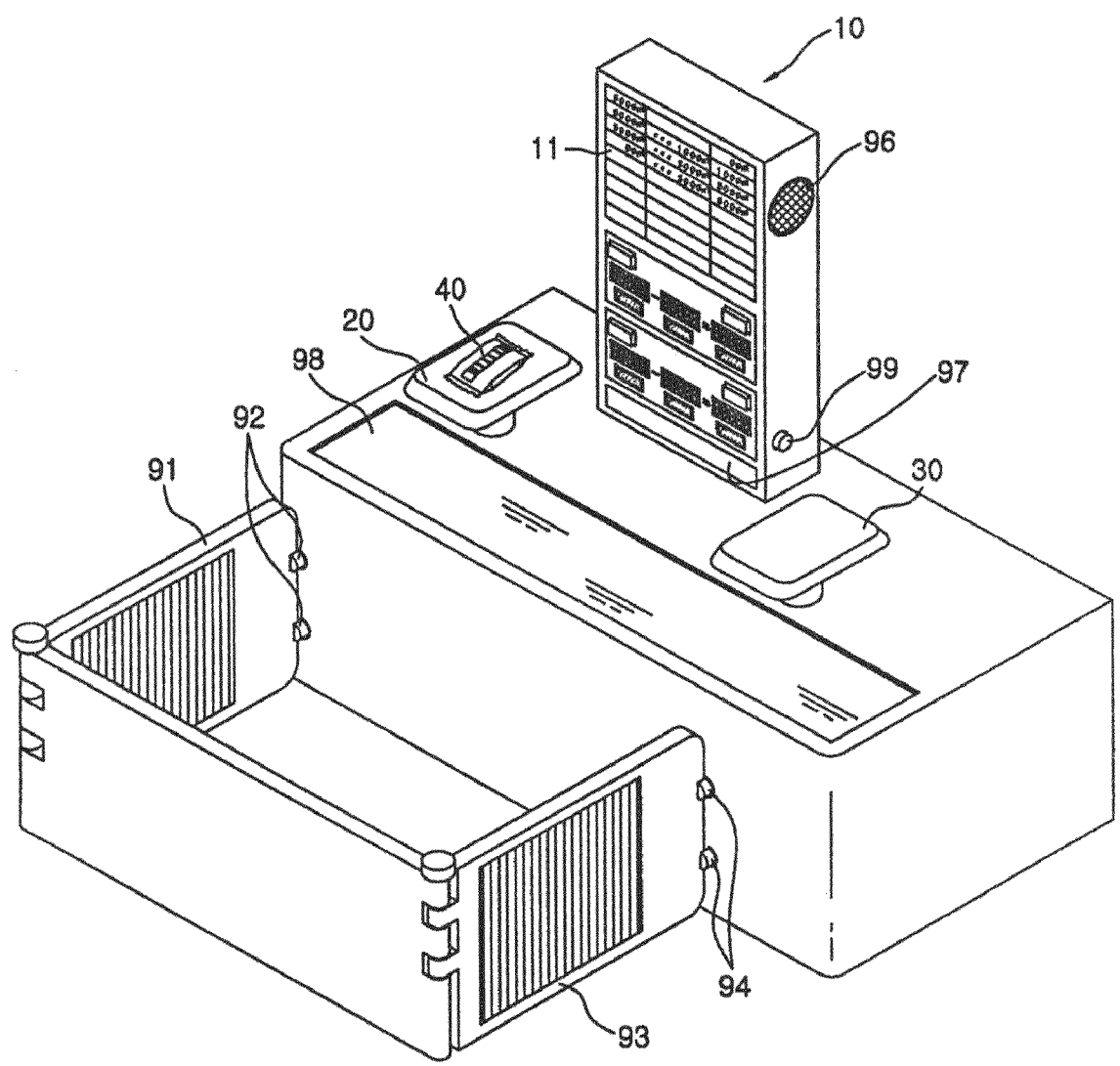
FIG. 1 is a perspective view showing an automatic product price payment counter according to an embodiment of the present invention.

Reference now should be made to the drawings, in which the same reference numerals are used throughout the different drawings to designate the same or similar components.

Hereinafter, the configuration and operation of the embodiments of the present invention will be described in detail with reference to the attached drawings.

Figure 2:
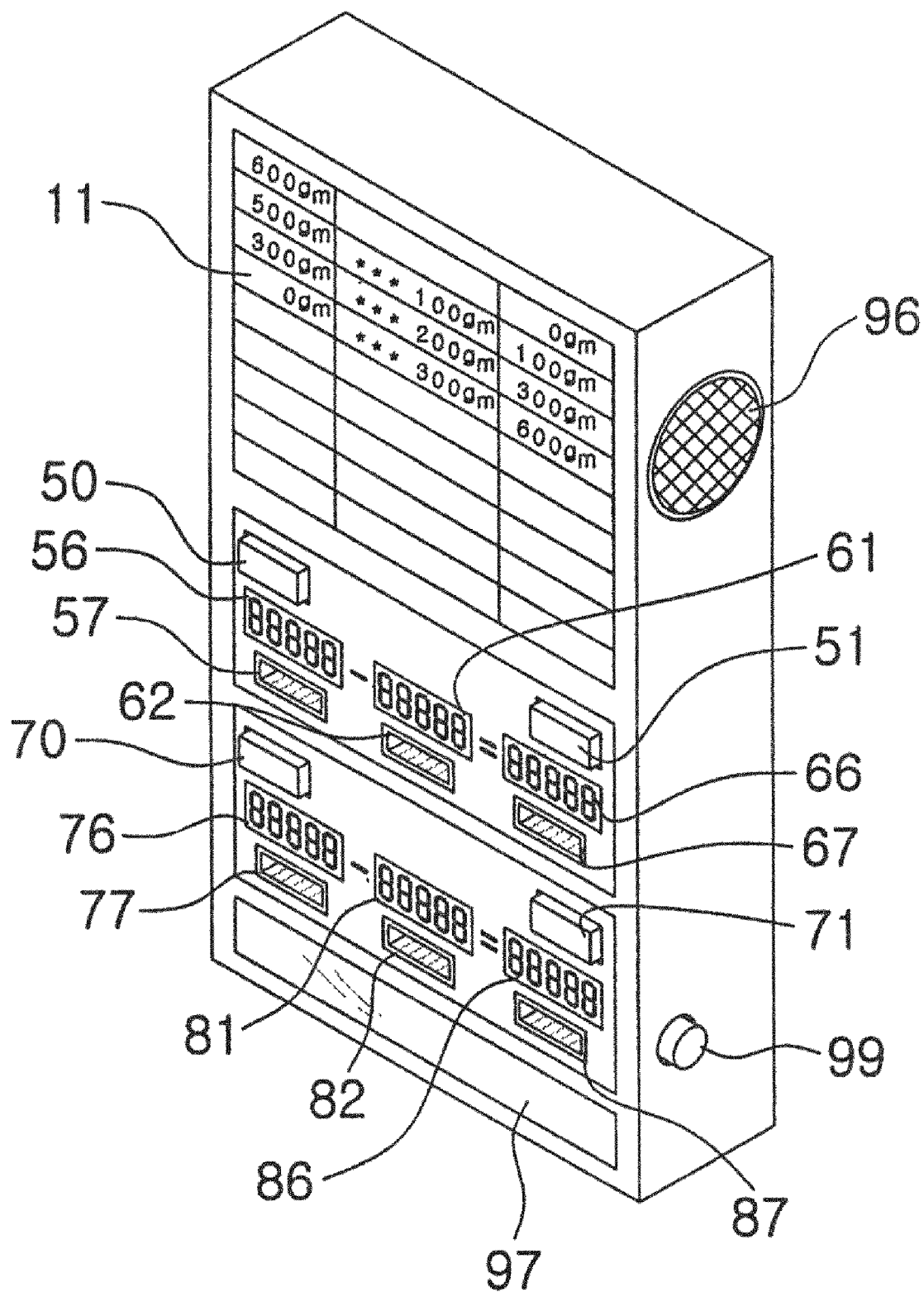
FIG. 2 is a perspective view showing the configuration of the calculator of the automatic product price payment counter according to the embodiment of the present invention.
Figure 3:
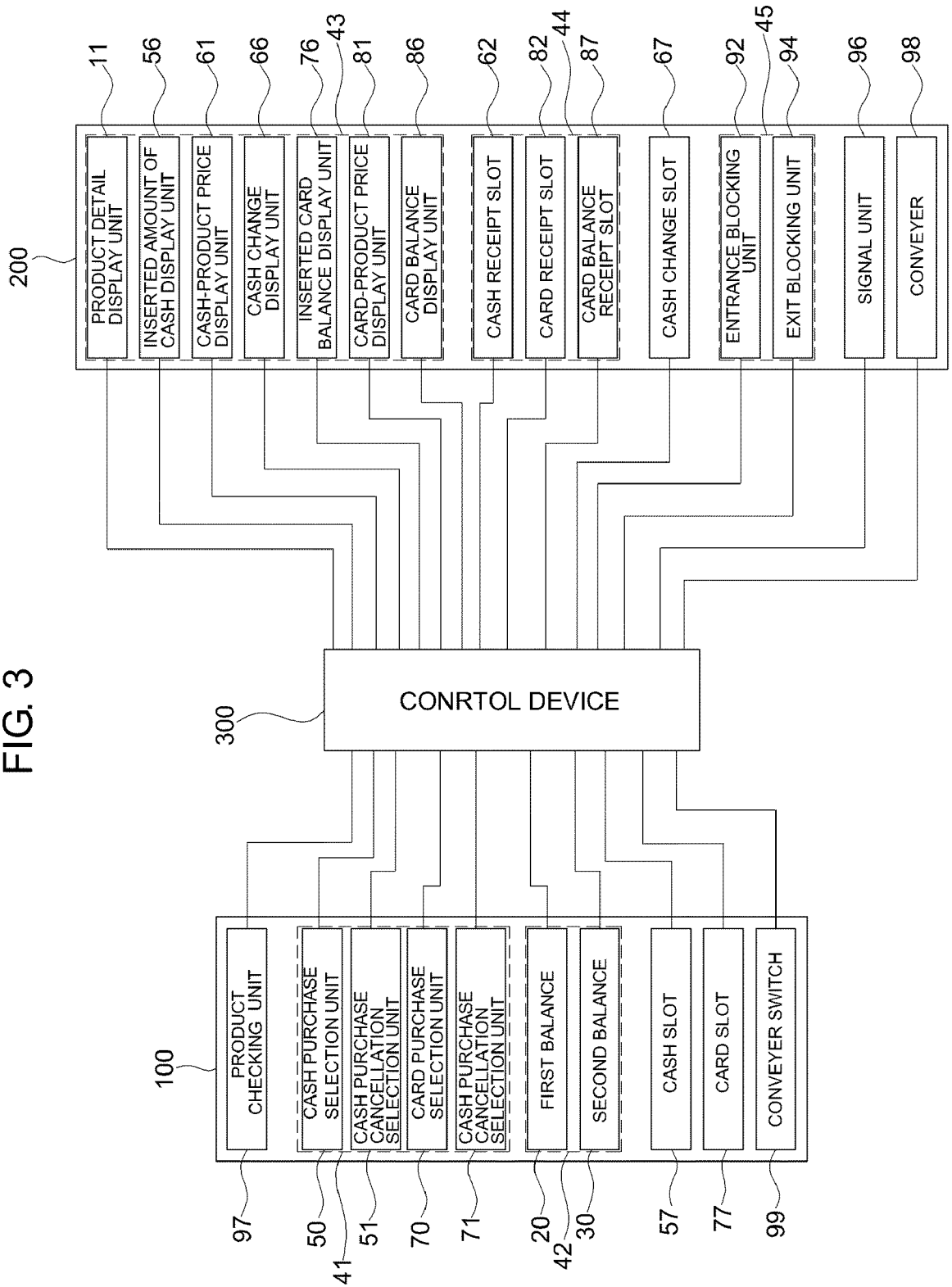
FIG. 3 is a block diagram showing the elements of the automatic product price payment counter according to the embodiment of the present invention.

FIG. 1 is a perspective view showing an automatic product price payment counter according to an embodiment of the present invention. FIG. 2 is a perspective view showing the configuration of the calculator of the automatic product price payment counter according to the embodiment of the present invention. FIG. 3 is a block diagram showing the element of the automatic product price payment counter according to the embodiment of the present invention.

Here, a card to be used here may be a debit card distributed for the market or a debit-type card issued from a specific store.

The automatic product price payment counter of the present invention is configured in such a way that a passageway is composed of a counter 10 provided in one side thereof and a wall provided in the other side thereof, and a closed space is composed of an entrance door 91 provided at the entrance thereof and an exit door 93 provided at the exit thereof, so that a purchaser is allowed to pass through when the purchaser normally performs a process of paying for the price of at least one product to be purchased in the space.

The input device 100 of the automatic product price payment counter of the present invention includes a product checking unit 97 configured to receive the information about the product by detecting a barcode 40 attached to the product, a button unit 41 configured to include a group of buttons for selecting the corresponding steps of paying for the price of the product, a weight measurement unit 42 configured to measure and input the weight of the product, a cash slot 57 and a card slot 77 provided so that the price of the product can be paid in cash or using a card, and a conveyor switch 99 additionally provided on one side of the calculator.

With regard to the configuration of the button unit 41, the button unit 41 includes a cash purchase selection unit 50 and a card purchase selection unit 71 for selecting the method of purchase, and a cash purchase cancellation selection unit and a card purchase cancellation selection unit 71 for aborting the method of purchase using cash or card.

Further, the weight measurement unit 42 includes a first balance 20 provided on the entrance door 91 side of the counter 10 and configured to measure the total weight of the product arranged before the information about the product is input using the product checking unit 97, and a second balance 30 provided on the exit door 93 side of the counter 10 and configured to measure the weight of the product after the product is taken off the first balance 20 and then the information about the corresponding product is input into the product checking unit 97.

The output device 200 of the automatic product price payment counter of the present invention includes a display unit 43 for displaying the input information about the product and performing the display at each step of paying for the price of the product, an output unit 44 for outputting the results, such as receipts, when the payment for the price of the product is normally completed, a blocking unit 45 for blocking the entry of the purchaser in such a way that the entrance/exit doors 91 and 93 are blocked until predetermined conditions are satisfied by the purchaser, and a cash change slot 67 for issuing change of the price of the product which was paid for in cash.

Further, as the additional element of the output device 200, the output device 200 includes a signal unit 96 provided on one side of the counter 10 and configured to solicit attention by warning the purchaser of malfunction or untreated process, and a conveyer 98 of a predetermined width formed on one side of the front end of the counter 10.

With regard to the detailed configuration of the display unit 43, the display unit 43 includes a product detail display unit 11 for clearly displaying a list of the weight measured by the first balance 20, the item, the unit price and the unit weight of the corresponding product input into the product checking unit 97, and the weight measured by the second balance 30, a cash-product price display unit 61 for displaying the price to be paid of a product when the purchaser selects to pay in cash, an inserted amount of cash display unit 56 for displaying the amount of cash inserted by the purchaser into the cash slot 57, a cash change display unit 66 for displaying the change remaining after the amount of money displayed by the cash-product price display unit 61 is subtracted from the amount of money inserted into the cash slot 57, a card-product price display unit 81 for displaying the price to be paid by a card when the purchaser selects to pay using a card, an inserted card balance display unit 76 for displaying the amount of money which can be paid by the card inserted into the card slot 77, and the card balance display unit 86 for displaying the balance on the card which remains after the amount of money displayed by the card-product price display unit 81 is subtracted from the amount of money of the card inserted into the card slot 77.

Further, the output unit 44 includes a cash receipt slot 62 for dispensing a receipt for the paid price of the product when the price of the product inserted into the cash slot 57 is normally paid, a card receipt slot 82 for dispensing a receipt for the paid price of the product when the price of the product inserted into the card slot 77 is normally paid, and a card balance receipt slot 87 for dispensing a receipt indicating the balance on the debit-type card after the price of the product has been paid.

Further, the blocking unit 45 includes an entrance blocking unit 92 provided on one side of the entrance door 91 of the counter 10 and configured to control opening and closing of the entrance door 91, and an exit blocking unit 94 provided on one side of the exit door 93 of the counter 10 and configured to control opening and closing of the exit door 93.

Here, although the blocking unit 45 performs the blocking using an electrically controlled automatic door or blocking bar, it is apparent that various variations can be made by those skilled in the art.

A control device 300, which includes a product information DataBase (DB) for storing basic information about each of the products (the item, weight, and unit price), performs comparison and determination processes on the information input from the input device 100, and controls the functions of the elements of the output device 200.

Figure 4:
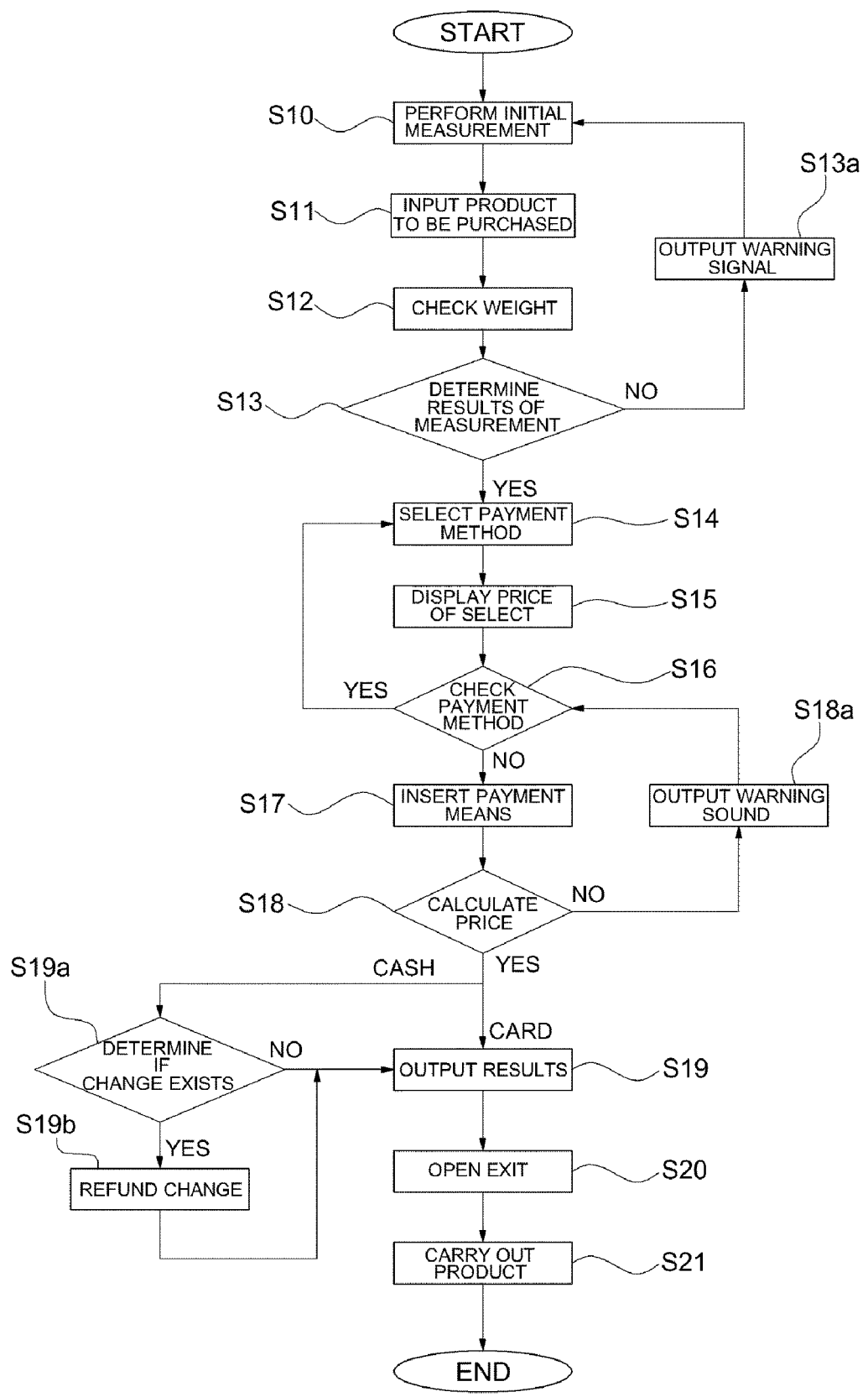
FIG. 4 is a flowchart showing the control of the automatic product price payment counter according to an embodiment of the present invention.

A series of operational relationships, in which a purchaser enters through the entrance door 91, completes payment for the price of the product at the automatic product price payment counter of the present invention of the above-described configuration, and then leaves the store through the exit door 93, will be described with reference to the flowchart of FIG. 4.

A purchaser, who passes through the entrance door 91 in which the blocking state of the entrance blocking unit 92 is released and approaches the counter 10, takes all products to be purchased out of a cart and puts them on the first balance 20. This step is referred to as initial measurement step S10.

The total weight of the products to be purchased is input to the control device 300 at step S10, and at the same time, power is applied to the counter 10 so that the counter 10 is put in a state wherein the price of the products can be calculated by inputting information about the products, and the purchaser can check the total weight of the products using the product detail display unit 11.

Next, the step of inputting the information about the products to the control device 300 is performed in such a way that the purchaser lifts the products which are put on the first balance 20 one by one and checks the barcode 40 of each of the corresponding products using the product checking unit 97 at step S10. This step is referred to as product input step S11.

In the process of performing step S11, the control device 300 receives the weight, obtained in such a way that the weight of the corresponding product is subtracted from the total weight, from the first balance 20 and sequentially displays the weight on the right of the product detail display unit 11 so that the purchaser can check the corresponding weight, and controls the information about the corresponding product received from the product checking unit 97, that is, the item name and unit price, so that the information is sequentially displayed on the center of the product detail display unit 11.

Next, the step of putting the product which has completed step S11 on the second balance is performed, and this step is referred to as product weight checking step S12.

At step S12, the control device 300 allows the weight received from the second balance to be sequentially displayed on the left of the product detail display unit 11, so that the purchaser can check the weight.

When steps S11 and S12 are repeatedly performed for each of the products to be purchased and all of the products which had been put on the first balance 20 at step S10 are moved to the second balance 30, the control device 300 performs the step of determining if the total weight of the products on the first balance is identical with the final weight on the second balance by comparing the first total weight of the products on the first balance with the final weight on the second balance. This step is referred to as measurement result determination step S12.

At step S13, it is determined whether the weight (the total weight of the products to be purchased) measured at step S10 is identical with the total weight measured by the second balance 30, and also a comparison of the weight subtracted at step S11, the weight obtained at step S12, and the weight of the corresponding product stored in the product information DB is performed.

If, as a result of the comparison at step S12, the values of the respective weights are not identical with each other, the control device 300 performs the step of performing control on the signal unit 96 in such a way that a warning signal indicating the fact that the compared weights are not identical with each other is issued (warning signal outputting step S13a), and the purchaser may perform input again starting from step S10.

If the values of the weights compared at step S13 are identical with each other, next payment method selection step S14 is performed. At step S14, the purchaser selects one of cash and a debit-type card as a method of paying for the price of products by selecting one of the cash purchase selection unit 50 and the card purchase selection unit 70.

According to the method of paying for the price of products selected by the purchaser at step S14, the following steps are performed. The next step is product price display step S15 of displaying the price of the products. The control device 300 controls the cash-product price display unit 61 or the card-product price display unit 81 so that one of them displays the total amount of money obtained by adding all the unit prices of the products displayed on the product detail display unit 11, thereby allowing the purchaser to check the price of the products to be paid.

The purchaser checks the price of the products to be paid at step S15. After step S15 is performed, the purchaser operates the cash purchase cancellation selection unit 51 or the card purchase cancellation selection unit 71 so that changing the method of paying for the price selected at step S14 can be carried out. This step is referred to as payment method checking step S16. If the purchaser changes the payment method at step S16, the process returns to step S14, so that the control device 300 performs control so that the payment method is selected again.

If the payment method is not changed at step S16, the next step, that is, payment means inserting step S17 is performed. The purchaser inserts cash or a card into the cash slot 57 or the card slot 77 at step S17.

Here, the control device 300 performs control so that the amount of money inserted into the cash slot 57 is displayed on the inserted cash display unit 56, and the balance of the card inserted into the card slot 77 is displayed on the card balance display unit 76 so that the purchaser can check the amount of money.

Next, price calculating step S18 is performed. The inserted amount of money is compared with the price of the products or the balance of the inserted card is compared with the price of the products based on the payment method selected at step S14, so that it is determined whether it is possible to pay for the price of the products at step S18. That is, the inserted amount of money or the balance of the card is compared with the sum of the price of the products, and it is determined whether the inserted amount of money or the balance of the card is equal to or greater than the sum of the price of the products at step S18.

Here, if the price of the products cannot be paid using the inserted amount of money or the balance of the card using the payment method selected by the purchaser, the control device 300 controls the signal unit 96 so as to issue a warning signal indicating the fact that the price of the products cannot be paid using the inserted amount of money or the balance of the card, and the process returns to step S16. This step is referred to as warning sound output step S18a. After step S18a is performed, the process can selectively return to step S14 so that control is performed so that the purchaser can change the payment method or check the inserted cash or card again.

Next, change existence/non-existence checking step S19a of determining if the payment method selected by the purchaser is a cash purchase and the amount of money inserted is greater than the product price is performed. Change existence/non-existence checking step S19a is the step of comparing the inserted amount of cash with the price of the products to be paid for, and determining whether change is to be given. If change is to be given at step S19a, the control device 300 performs control so that the change is refunded to the purchaser through the cash change slot 67 at change refund step S19b. When the inserted amount of cash is equal to the price of the product to be paid at step S19a, there is no change to be refunded, so that the next step, that is, result output step S19 is performed without the intervention of step S19b.

When change is refunded at step S19b, the inserted amount of cash is equal to the price of the product at step S19a, or step S18 is normally performed using debit-type card payment, result output step S19 is performed.

Control is performed so that a receipt for the completed cash payment is output through the cash receipt slot 62, a receipt based on the payment by the card is output through the card receipt slot 87, and a card balance-recorded receipt for checking the balance is output through the card receipt slot 87 at step S19.

After the receipt is normally output as described above, exit opening step S20 is performed. The control device 300 performs control so that the exit blocking unit 94 of the exit door 93 is released and the purchaser can leave at step S20.

Thereafter, at product carrying-out step S21, the purchaser carries out the products put on the second balance 30, and leaves through the opened exit door 93, thereby terminating the control flow.

Here, at the same time as the purchaser is carrying away the products from the second balance 30, the weight received from the second balance 30 is "0", so that the control device 300 controls power so that payment at the counter 10 of the price of the products is not possible.

Further, if the exit blocking unit 94 blocks the exit door 93 after the purchaser exits, control is performed on the entrance blocking unit 92 so that it is opened, with the result that the next purchaser who is waiting outside can approach the counter 10.

As described above, the automatic product price payment counter of the present invention allows a purchaser to directly select at least one product without a clerk being in charge of calculating the price of the product in a distribution center, such as a discount market, and to process the calculation and payment for the product by her/himself, so that the advantages of the burden of expenses for managing in the distribution industry can be solved through internal structure improvement and so that good-quality services can be provided to customers.

In particular, at this point in time when medium/large-sized discount stores are jumbled up at present and at which enterprises, the existence of which is being threatened due to heated competitive pricing, are increasing, personnel expenses, which occupy a relatively large burden of management expenses, are sharply reduced, so that sales profits can be maximized, with the result that economic repercussions are expected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic product price payment counter comprising:
   an input device comprising a product checking unit configured to input information about one or more products to be purchased by detecting a barcode attached on each of the products, and a button unit configured to include a group of buttons for selecting corresponding steps of paying for a price of the products;

an output device comprising a display unit for displaying the input information about the products and performing a display at the corresponding steps of paying for the price of the products, and an output unit for outputting various types of receipts when payment for the price of the products is completed; and a control device for performing comparison and determination on the information input from the input device, and controlling functions of the output device;

wherein the input device comprises a weight measurement unit comprising a first balance provided on an entrance door side of the counter and configured to measure a total weight of the products before the information about the products is input using the product checking unit and a second balance provided on an exit door side of the counter and configured to measure a weight of the products which have been taken off from the first balance and about which the information has been input using the product checking unit, and a cash slot and a card slot provided to pay for the price of the products using cash and a card, respectively;

wherein the output device comprises a cash change slot configured to refund change after the price of the products has been paid, and a blocking unit configured to include an entrance blocking unit and an exit blocking unit which are provided on first sides of entrance and exit doors of the counter, respectively, and which control opening and closing of the corresponding doors; and wherein the control device controls the exit blocking unit of the exit door so that a purchaser can leave if the total weight of the products measured by the first balance is identical with the total weight measured by the second balance and if the payment for the price of the products, about which the information has been input using the product checking unit, has normally completed and various types of receipts are output to the output unit, and controls the entrance blocking unit of the entrance door so that a next purchaser who is waiting can approach the counter if the exit blocking unit blocks the exit door after the purchaser goes out.

2. The automatic product price payment counter as set forth in claim 1, wherein the control device controls power so that the payment of the price of the products can be performed when the purchaser puts the products on the first balance, and controls power so that the payment of the price of the products cannot be performed when the purchaser removes the products from the second balance after the purchaser normally completes the payment of the price of the products.

3. The automatic product price payment counter as set forth in claim 1,
   wherein the input device further comprises a conveyor switch used when the purchaser desires to easily move the product;
   wherein the output unit further comprises a conveyor of a predetermined width provided on one side of a front end of the counter, and a signal unit provided on one side of the counter; and
   wherein the control device controls the signal unit so that the signal unit issues an alarm when the total weight of the products measured by the first balance is not identical with the total weight measured by the second balance, or when the payment for the price of the products input using the product checking unit is abnormally processed.

4. The automatic product price payment counter as set forth in claim 2,
   wherein the input device further comprises a conveyor switch used when the purchaser desires to easily move the product;
   wherein the output unit further comprises a conveyor of a predetermined width provided on one side of a front end of the counter, and a signal unit provided on one side of the counter; and
   wherein the control device controls the signal unit so that the signal unit issues an alarm when the total weight of the products measured by the first balance is not identical with the total weight measured by the second balance, or when the payment for the price of the products input using the product checking unit is abnormally processed.

* * * * *